(12) United States Patent
Bueter

(10) Patent No.: US 9,989,075 B2
(45) Date of Patent: Jun. 5, 2018

(54) WORKING CYLINDER

(71) Applicant: BUEMACH ENGINEERING INTERNATIONAL B.V., Ta Emmen (NL)

(72) Inventor: Josef Bueter, Haren/Altenberge (DE)

(73) Assignee: Buemach Engineering International B.V., Emmen (NL)

( * ) Notice: Subject to any disclaimer, the term of this patent is extended or adjusted under 35 U.S.C. 154(b) by 457 days.

(21) Appl. No.: 14/429,452

(22) PCT Filed: Sep. 13, 2013

(86) PCT No.: PCT/DE2013/000526
§ 371 (c)(1),
(2) Date: Mar. 19, 2015

(87) PCT Pub. No.: WO2014/044240
PCT Pub. Date: Mar. 27, 2014

(65) Prior Publication Data
US 2015/0233395 A1    Aug. 20, 2015

(30) Foreign Application Priority Data
Sep. 19, 2012    (DE) .................... 20 2012 009 001 U

(51) Int. Cl.
*F15B 15/14*    (2006.01)

(52) U.S. Cl.
CPC ...... *F15B 15/1442* (2013.01); *F15B 15/1438* (2013.01)

(58) Field of Classification Search
CPC .............. F15B 15/1433; F15B 15/1438; F15B 15/1442
See application file for complete search history.

(56) References Cited

U.S. PATENT DOCUMENTS 3,643,551 A    2/1972  Berg
3,650,182 A    3/1972  Phillips
(Continued)

FOREIGN PATENT DOCUMENTS

CH           643638 A5 *  6/1984  .......... F15B 15/1438
DE          2060383 A1    6/1971
(Continued)

*Primary Examiner* — Logan Kraft
(74) *Attorney, Agent, or Firm* — Laurence A. Greenberg; Werner H. Stemer; Ralph E. Locher

(57) ABSTRACT

A cylinder has first and second coupling partners. The first coupling partner is a cylindrical tube. The second coupling partner is a closing element. One coupling partner is inserted axially into the other coupling partner. Each of the coupling partners has an annular groove. The groove of the inserted coupling partner is an external groove. The groove of the remaining coupling partner is an internal groove and the grooves of the coupling partners lie opposite one another. The working cylinder includes a spring-loaded coupling ring, and which when deformed in a tensioning direction, can be fully accommodated by the groove of one coupling partner and which, when deformed in the release direction, engages in the grooves of both coupling partners. The inserted coupling partner is oversized in relation to the remaining coupling partner and provides a additional frictional connection.

10 Claims, 8 Drawing Sheets

(56) References Cited

U.S. PATENT DOCUMENTS

| | | | |
|---|---|---|---|
| 5,176,413 A | 1/1993 | Westman | |
| 5,680,808 A | 10/1997 | Day et al. | |
| 5,980,339 A * | 11/1999 | Hartman | F15B 15/149 440/61 G |
| 6,101,922 A * | 8/2000 | King | F15B 15/1438 92/164 |
| 6,196,112 B1 | 3/2001 | Büter | |
| 7,097,211 B2 * | 8/2006 | Adams | F16L 37/088 285/305 |
| 7,350,453 B1 * | 4/2008 | Bailey | F15B 15/1438 92/128 |
| 8,240,240 B2 * | 8/2012 | Fitzkee | F15B 15/2846 91/1 |
| 8,807,016 B2 | 8/2014 | Beumer | |
| 8,814,219 B2 | 8/2014 | Hennemann et al. | |
| 2009/0110476 A1 | 4/2009 | Patzelt | |
| 2011/0030553 A1 | 2/2011 | Beumer | |

FOREIGN PATENT DOCUMENTS

| | | |
|---|---|---|
| DE | 8706891 U1 | 10/1987 |
| DE | 68923378 T2 | 3/1996 |
| EP | 0880652 A1 | 8/2002 |
| EP | 2282101 A2 | 2/2011 |
| FR | 1135349 A | 4/1957 |
| FR | 1363852 A | 6/1964 |
| GB | 2325277 A | 11/1998 |
| WO | 2009116857 A1 | 9/2009 |

\* cited by examiner

WORKING CYLINDER

BACKGROUND OF THE INVENTION

Field of the Invention

The invention relates to a working cylinder, provided in particular as a hydraulic or pneumatic pressurized flow consumer.

Working cylinders as hydraulic or pneumatic pressurized flow consumers are generally known from the prior art.

Working cylinders of said type are generally of multi-part form and have, inter alia, a cylinder barrel and a closure element connected thereto.

The connection between the closure element and the cylinder barrel is in this case realized, in a known manner, by way of a positively locking and/or non-positively locking and/or cohesive connection, wherein the connection may be releasable or non-releasable depending on the application.

In the narrower sense, releasable connections are in this case normally realized by means of screw connections between the cylinder components or by means of fit connections, whereas the non-releasable connections are generally provided by welding or brazing of the cylinder components.

A working cylinder with screw connection is known for example from document EP 0 880 652 B1.

Here, the closure parts of the working cylinder are connected to one another by way of a thread pairing.

Such a screw connection of the cylinder components has however proven to be disadvantageous in particular in that, to ensure the leak-tightness of the working cylinder and to provide necessary positional conformity of the main ports, extensive technological outlay is required, which in turn entails high costs for the production of a working cylinder of said type.

A generic working cylinder having a non-releasable connection between the respective cylinder components is disclosed in the document DE 2 060 383 A, wherein in said document, the closure parts are connected to the cylinder barrel by welding.

The disadvantages of said technical solution lie in particular in the additional process outlay for the welding and in material inaccuracies of the cylinder barrel or of the closure parts which arise under some circumstances as a result of the introduction of heat during the welding process.

Furthermore, it is possible here that the introduction of heat by the welding process has an adverse effect on the endurance strength of the connection that is provided.

Furthermore, it is known from the prior art for individual components of a working cylinder, in particular closure part and cylinder barrel, to be connected to one another in positively locking fashion by means of a coupling ring.

For this purpose, the components to be connected have respectively corresponding annular grooves into which the coupling ring engages and thus provides the positive locking between the components.

A disadvantage of such connections lies in the fact that the coupling ring has a certain undersize in relation to the width of the annular grooves in order that the coupling ring can assume its final position in the annular grooves during the assembly process. This results in a minimal clearance which, in load alternation states of the working cylinder, can lead to minimal axial relative movements between the closure part and cylinder barrel.

Owing to these relative movements, the seal elements provided between the components are subjected to undesired abrasion grinding phenomena, which in the worst case lead to a defect of the seal elements and thus to failure of the working cylinder.

BRIEF SUMMARY OF THE INVENTION

It is therefore an object of the invention to provide a working cylinder which is particularly simple and inexpensive to produce and which at the same time, even in the event of load alternation, exhibits high endurance strength and leak-tightness and thus a lengthened service life.

The object is achieved by means of the features specified in the independent claim(s). Preferred refinements will emerge from the subclaims.

A working cylinder according to the invention has a first coupling partner and a second coupling partner. The first coupling partner is in this case in the form of a cylinder barrel and the second coupling partner is in the form of a closure element. A closure element may be either a cylinder base or a guide part which, for example, receives a piston rod.

Furthermore, according to the invention, one of the coupling partners is inserted into the respective other coupling partner.

In this context, "inserted" is to be understood to mean that one coupling partner is engaged around radially by the respective other coupling partner.

According to the invention, the working cylinder is distinguished by the fact that the coupling partners each have an annular groove which is preferably of encircling form, wherein the annular groove of the inserted coupling partner is formed by an external groove and the annular groove of the other coupling partner is formed by an internal groove.

According to the invention, the axial positioning of the annular groove in the coupling partners is such that the annular grooves are situated correspondingly opposite one another when the coupling partners are in the coupled state.

In this context, "situated correspondingly opposite" is to be understood to mean that the opening regions of the annular grooves face toward one another and, as viewed in the axial direction of the working cylinder, are situated at the same level.

Furthermore, a working cylinder according to the invention has a coupling ring which can be resiliently braced.

Said coupling ring, when elastically deformed in its radial bracing direction, can be fully received in the annular groove of one coupling partner.

In this case, the radial bracing direction describes the deformation direction of the coupling ring in which said coupling ring is deformed under the action of an external radial force, whereby a radial preload is generated in the coupling ring.

It is particularly advantageously the case that the coupling ring is fully received in the annular groove of a coupling partner to just such an extent as to ensure that one coupling partner can be inserted in unimpeded fashion into the other coupling partner.

According to the invention, for this purpose, the annular groove which fully receives the coupling ring has an expansion space into which the coupling ring can deflect as the coupling partners are inserted one into the other.

When a final assembled position is assumed, that is to say when the coupling partners are positioned relative to one another such that the annular grooves thereof are situated correspondingly opposite one another, the coupling ring deforms, according to the invention, in its relaxation direction.

In this connection, the relaxation direction describes the deformation direction of the coupling ring in which said coupling ring deforms owing to the acting preload.

The deformation of the coupling ring in its relaxation direction particularly advantageously has the effect that, in the final assembled position, said coupling ring protrudes into and thus engages with the annular groove of the other coupling partner. Abutment of the axial outer walls of the coupling ring against the axial walls of the annular grooves of the two coupling partners has the effect of providing a positively locking connection between the coupling partners. The coupling partners are fixed in their axial relative position with respect to one another by the positive locking. Axial forces exert a shear load on the coupling ring. The solution according to the invention also encompasses the possibility of multiple coupling rings being arranged, so as to abut against one another axially, in an annular groove pair of correspondingly broad form, in order that high shear forces can be accommodated. It is preferably the case that, in the coupled state, the coupling ring bears by way of its radially external wall resiliently against the groove base wall of the annular groove of the other coupling partner, such that said coupling ring is reliably fixed in its position.

The working cylinder according to the invention is furthermore characterized in that the coupling partner which is to be inserted in each case has a corresponding oversize, and in that, in the final assembled position, there is thus an interference fit between the coupling partners. The interference fit produces frictional locking between the coupling partners. Axially acting forces can be accommodated by way of the frictional locking. Furthermore, the coupling partners are secured so as to be prevented from twisting.

In this way, as a special technological advantage of the solution, a hybrid coupling action is realized which is composed of a non-positive locking coupling action effected by the interference fit and a positive locking coupling action effected by the coupling ring, said hybrid coupling action being distinguished by an increase of the maximum axial forces that can be accommodated and by an improvement in the endurance strength of the working cylinder. The axial forces to be accommodated can be divided between the two coupling actions, wherein the ratio can be set through design measures.

The two coupling partners are fixed to one another axially without a clearance by way of the frictional locking. Thus, as a special advantage, any axial movement of the coupling partners relative to one another in the event of alternation between the working cylinder being subjected to load and relieved of load during intended operation, which axial movement could for example lead to damage of any seal elements that are provided, can be prevented.

According to the invention, the positive locking connection by way of the coupling ring and the non-positively locking connection by way of the frictional locking between the coupling partners act together.

In particular, the frictional locking has the effect that the relative position assumed by the coupling partners under high loads, which relative position corresponds to a clearance end position of the coupling ring with respect to the axial side walls of the annular grooves, is maintained even in the event of load alternation. The frictional locking is thus overcome at least in the presence of full operating pressure, such that the coupling partners are moved into the clearance end position and, there, are prevented from further axial relative movement by the positive locking. However, the frictional locking prevents an axial return movement out of said clearance end position and thus fixes the coupling partners relative to one another in the relative position of the clearance end position.

By means of the proposed solution, a working cylinder is thus provided in which, firstly, the required coupling partners are connectable to one another in positively locking fashion through the use of a load-bearing coupling ring, wherein the connection is realized in a particularly simple manner by virtue of the coupling partners being inserted one into the other.

Secondly, a relative movement between the coupling partners is fully prevented by the frictional locking that is realized.

According to the invention, it may furthermore likewise be provided that, in the presence of relatively low loads, the axial forces are accommodated solely by the non-positively locking interference fit, wherein the positive locking effected by the coupling ring acts in this case merely as a safeguard for preventing the inserted coupling partner from being pulled out of the respective other coupling partner.

This coupling solution reduces the manufacturing, material and assembly costs, which in turn have a considerable influence on the reduction of energy costs.

Adverse effects arising from the action of heat, such as may be encountered for example in the case of a shrink-fit coupling or in the case of a welded connection, are eliminated.

In relation to known solutions, a working cylinder according to the invention thus has the technological advantages firstly that said working cylinder is particularly easy to produce and, furthermore, no additional method steps are required, in particular for the production of a cohesive connection between the coupling partners, whereby in particular, the production costs for a working cylinder of said type can be lowered.

Furthermore, a working cylinder according to the invention is characterized, in relation to conventional devices, by greater endurance strength and thus a lengthened service life. As a further major advantage, all angular positions of the closure parts, and thus the position of the main ports, can be realized easily and without additional outlay.

In a preferred refinement of the invention, the second coupling partner, that is to say the closure part, can be inserted into the first coupling partner, that is to say the cylinder barrel, wherein the coupling ring can be fully received in the annular groove of the second coupling partner.

The technological advantage of this refinement arises in particular from the fact that the relatively deep annular groove required for fully receiving the coupling ring in the braced position is arranged in the second coupling partner, and thus in the closure element, and not in the cylinder barrel which acts as first coupling partner.

This particularly advantageously permits the use of even thin-walled cylinder barrels.

Furthermore, this results in assembly advantages, as the coupling ring merely has to be pushed onto the second coupling partner, and not inserted in cumbersome fashion into the first coupling partner, before the production of the positively locking connection.

Here, however, the invention is not restricted to the arrangement of the relatively deep annular groove in the second coupling partner. Rather, depending on the application, it is likewise possible for the annular groove for fully receiving the coupling ring to be arranged in the first coupling partner, and thus in the cylinder barrel.

Furthermore, the solution according to the invention also encompasses a configuration of a working cylinder in which the cylinder barrel is inserted into the closure element.

In the case of a refinement of the working cylinder according to the invention, the second coupling partner, that is to say the closure part, has an overhang, wherein the overhang engages in sections over the first coupling partner at the outer lateral surface thereof.

Such an overhang of the first coupling partner and thus of the cylinder barrel particularly advantageously has the effect, in particular in the presence of high internal pressures in the cylinder barrel, which cause the cylinder barrel to be elastically expanded, of increasing the axial forces that can be accommodated, as the multiaxial stress state in the cylinder barrel can be offset in favor of the axial forces.

A further advantage may arise from the fact that the cylinder barrel provides additional frictional locking between the coupling partners in the region of the overhang.

In the case of additional non-positively locking coupling in the case of a working cylinder with pushed-on cylinder barrel and provision of an interference-fit connection, the overhang furthermore advantageously acts so as to prevent a diminishment of the non-positively locking action of the frictional connection.

In a further advantageous variant of the invention, the coupling ring or the coupling partner which does not fully receive the coupling ring has a run-on bevel.

As one coupling partner is inserted into the other coupling partner, said run-on bevel or run-on bevels cause(s) the coupling ring to be braced and the coupling ring to be fully received in the respective annular groove of the coupling partner which fully receives the coupling ring.

Thus, as a special technological advantage, it is not necessary for the coupling ring to be installed into the annular groove, which fully receives it, of the respective coupling partner by way of additional apparatuses or expenditure of effort before the coupling partners are inserted one into the other.

With regard to the run-on bevel, it is self-evident to a person skilled in the art that, in special configurations, in particular of the coupling ring, it is also possible for multiple individual run-on bevels to be provided on the respective coupling partner instead of a single run-on bevel.

Furthermore, the invention preferably provides that, between the two coupling partners, there is arranged a sealing element which, in the region of the positively locking connection, prevents an escape of a working medium from the working cylinder.

During insertion of the first coupling partner into the second coupling partner, a sealing element of said type can particularly advantageously be held in the second coupling partner in the region of the run-on bevel of the first coupling partner, and thus particularly simple installation of the sealing element can be ensured.

In a preferred refinement, the coupling partners of a working cylinder according to the invention have axially offset further annular grooves for receiving further, likewise axially offset coupling rings.

The provision of multiple annular grooves and multiple coupling rings is advantageous in particular when the connection is to be subjected to high axial forces during use of the working cylinder.

To ensure that the coupling partners are inserted one into the other reliably and without damage even in the case of multiple coupling rings being arranged between the coupling partners, the annular grooves preferably likewise have run-on bevels, wherein the run-on bevels cause the multiple coupling rings to once again be fully received in the respective annular grooves of the coupling partner which fully receives the coupling rings.

Furthermore, a further advantageous variant of the invention provides that the coupling ring has a circular cross section.

At the same time, the geometrical contour of the annular groove of the coupling partner which does not fully receive the coupling ring is preferably at least partially adapted to the circular cross section of the coupling ring. One advantage here consists in that, when the positively locking connection of the coupling partners is subjected to load, the notch effects arising in the annular groove of the coupling partner which does not fully receive the coupling ring can be reduced in an effective manner in relation to an annular groove of rectangular cross section.

To reduce the notch effects arising in the other coupling partner, the annular groove thereof may likewise have a rounded contour in its groove base.

In relation to coupling rings with a rectangular cross section, a coupling ring according to the invention with circular cross section has a more expedient stress profile in its interior under the action of load, whereby in particular, the durability of the positively locking connection of the working cylinder can be yet further improved.

At the same time, a coupling ring with circular cross section can be produced particularly easily and inexpensively.

A likewise advantageous refinement of the invention presents a simple but effective way of achieving a further improvement. A cylinder barrel preferably exhibits higher material quality, in particular a higher modulus of elasticity, than a closure part. To keep the surface pressure at the side walls within the surface pressure values admissible for the specific material, but at the same time to avoid forming the annular grooves to be deeper than required, the solution was arrived at in which the coupling ring, in its engaged position, can engage with a greater area of overlap into the coupling partner with the lower modulus of elasticity. The area of overlap is to be understood to mean that part of the area of the axially directed side wall of the coupling ring by which said coupling ring bears under axial load against the side wall of the groove of a coupling partner. The areas of overlap may in this case be defined in a simple manner by the depth of the annular groove of the coupling partner which does not fully receive the coupling ring and the width of the axially directed side wall of the coupling ring. In combination with the preferred embodiment, in which the cylinder barrel is situated at the outside, the depth of the annular groove in the cylinder barrel can be made very small, whereas the coupling ring, in the engaged position, engages into the closure part to a correspondingly greater depth.

In a further advantageous refinement of the invention, the coupling ring is of conical form.

In this context, a conical design is to be understood to mean that the coupling ring has a rectangular cross section and that, owing to the rectangular cross section, on an axial top side and the bottom side of the coupling ring, two different ring diameters are formed, wherein the conical form in this case has the effect, for example, that the ring diameter of the top side of the coupling ring is smaller than the ring diameter of the bottom side. The radial delimiting surfaces thus correspond to the lateral surface of a flat frustum.

At the same time, the annular groove of the coupling partner which does not fully receive the coupling ring is formed such that, when the coupling ring is deformed in the relaxation direction, the conical coupling ring pivots into the corresponding annular groove and, after said relaxation, the two axial walls of the conical coupling ring bear substantially over the full area against the respectively corresponding wall of the two annular grooves. To realize the formability of a conical coupling ring, said coupling ring is of segmented form, wherein this may be realized in particular by way of axial incisions or by virtue of the coupling ring being formed in multiple parts. It is possible to realize an expedient, relatively low surface pressure, which is advantageous in particular in the case of a relatively low-grade material in particular of a closure part, with a simultaneously narrow form of the coupling ring. In this way, it is simultaneously achieved as a special advantage that the annular groove which fully receives the coupling ring need merely be designed to be of a depth corresponding to the width of the ring cross section of the conical coupling ring.

By means of such a conical form of the coupling ring, a particularly reliable and durable connection of the coupling partners is realized.

Furthermore, a particularly advantageous embodiment of the invention provides that an elastic element is provided in the annular groove, which fully receives the coupling ring, of the respective coupling partner.

According to the invention, said elastic element is designed so as to act radially on the coupling ring and thus optimize the deformation thereof in the relaxation direction.

The elastic element thus advantageously permits, in a particularly simple manner, a reliable deformation of the coupling ring in its relaxation direction at every point, whereby correct seating of the coupling ring in the annular grooves of the coupling partners can be ensured over the entire length of said coupling ring.

In this case, the elastic element may also serve entirely on its own to realize the capacity for resilient bracing of the coupling ring, thus permitting optimization of the material of the coupling ring.

In a preferred refinement of the working cylinder according to the invention, access openings are provided in the respectively externally situated coupling partner, which access openings permit in particular mechanical manipulation of the coupling ring from the outside.

By way of the mechanical manipulation of the coupling ring, said coupling ring is, when required, pressed into the annular groove, which fully receives the coupling ring, of the first or second coupling partner to such an extent that a release of the positively locking connection between the two coupling partners is effected. The coupling partners can thereafter be pulled apart again.

The mechanical manipulation may in this case preferably be realized by way of screws or even simply by way of pins which, using a special tool, are displaced inward until the coupling ring passes beyond the joint plane of the two coupling partners, and thus the positive locking is released.

It is thus possible, as a special technological advantage, to provide a releasable connection between the coupling partners of a working cylinder according to the invention, which permits disassembly of the coupling partners, and repair or alteration if necessary.

BRIEF DESCRIPTION OF THE SEVERAL VIEWS OF THE DRAWING

The invention will be explained in more detail below, on the basis of exemplary embodiments, with reference to.

DESCRIPTION OF THE INVENTION

Figure 1:
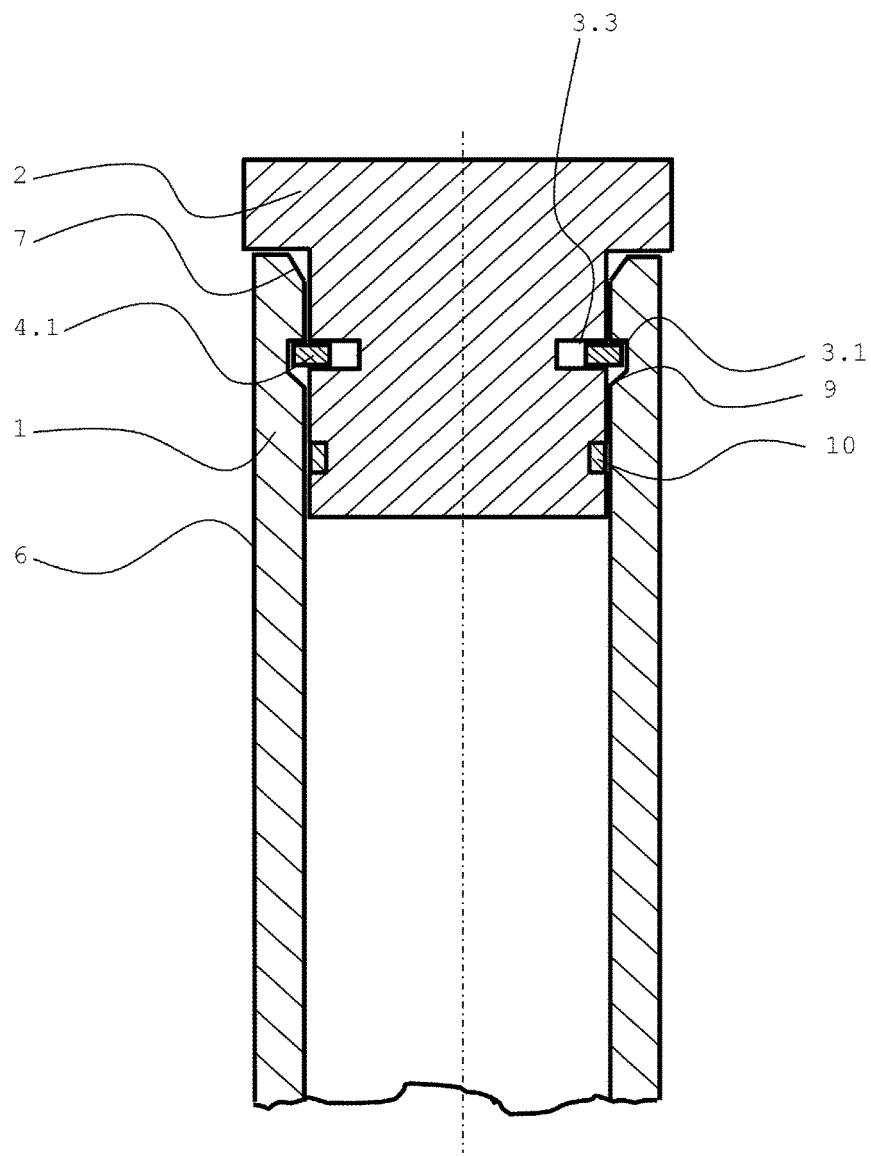
FIG. 1 which shows a sectional illustration of a working cylinder with a coupling ring, FIG. 2 which shows a half-section of a working cylinder with two coupling rings, FIG. 3 which shows a half-section of a working cylinder with circular coupling ring cross section, FIG. 4 which shows a half-section of a working cylinder with circular coupling ring cross section and an overhang, FIG. 5 which shows a half-section of a working cylinder with a conical coupling ring, FIG. 6 which shows a half-section of a working cylinder with a conical coupling ring and an elastic element, FIG. 7 which shows a sectional illustration of a working cylinder with access openings, in plan view, and FIG. 8 which is a detail illustration of the coupling partners in a clearance end position.

FIG. 1 shows a working cylinder according to the invention in a full section.

The working cylinder is of multi-part form and has a cylinder barrel 1 and a closure element 2, wherein the closure element 2 has been partially inserted into the cylinder barrel 1.

According to the invention, the cylinder barrel 1 and closure element 2 are coupled to one another by means of a positively locking connection.

The positively locking connection is in the present case achieved by virtue of a coupling ring 4.1 being arranged within the working cylinder.

In the present case, the coupling ring 4.1 has a rectangular cross section, wherein according to the invention, coupling rings with other forms of cross section may also be used.

To receive the coupling ring 4.1, the cylinder barrel 1 and the closure element 2 have in each case a first annular groove 3.1 and 3.3, wherein the first annular groove 3.1 of the cylinder barrel 1 is in the form of an encircling internal groove and the first annular groove 3.3 of the closure element 2 is in the form of an encircling external groove.

The first annular groove 3.3 of the closure element 2 is, in the present exemplary embodiment, designed such that it can receive the coupling ring 4.1 fully, and in particular to such an extent as to ensure that the closure element 2 can be inserted into the cylinder barrel 1 without complications.

As the closure element 2 is inserted into the cylinder barrel 1, the coupling ring 4.1 is pushed into the first annular groove 3.3 of the closure element 2 and, in the process, is braced in its bracing direction.

When the closure element 2 reaches its final assembled position in the cylinder barrel 1, with the annular grooves 3.1 and 3.3 being situated correspondingly opposite one another, it is made possible for the coupling ring 4.1 to relax in its relaxation direction, enabling the coupling ring 4.1 to engage simultaneously into the annular grooves 3.1 and 3.3.

The positive locking of the coupling of the cylinder barrel 1 and of the closure element 2 is realized according to the invention in that, in the final position of the closure element 2 in the cylinder barrel 1, that surface of the coupling ring 4.1 which faces toward the closure element-side end of the cylinder barrel 1 bears against those walls of the annular grooves 3.1 and 3.3 which face toward the coupling ring 4.1.

The closure element 2 is thus prevented in an effective manner from possibly being pulled out of the cylinder barrel 1, in particular during use of the working cylinder.

Furthermore, a working cylinder according to the invention has a sealing element 10 by means of which an escape of a working medium from the working cylinder is prevented in the region of the coupling between the cylinder barrel 1 and closure element 2.

In order that, as the closure element 2 is inserted into the cylinder barrel 1, the coupling ring 4.1 is pushed into the annular groove 3.3 of the closure element 2 and, at the same time, damage to the sealing element 10 is prevented, the cylinder barrel 1 additionally has, on the end facing toward the closure element 2, a run-on bevel 7 of encircling form.

In order that, as the closure element 2 is inserted further into the cylinder barrel 1, damage to the sealing element 10 is also prevented as it passes over the annular groove 3.1 of the cylinder barrel 1, the annular groove 3.1 also has an annular groove bevel 9, which is also required at the same time if multiple coupling rings are used in parallel but with an axial spacing to one another.

As a particular technological feature of the present working cylinder, the external diameter of the closure element 2 has an oversize in relation to the internal diameter of the cylinder barrel 1.

The oversize has the effect that, in the final assembled position of the closure element 2, an interference fit and thus frictional locking is produced between said closure element and the cylinder barrel 1.

Owing to the frictional locking that is provided, the closure element 2 and the cylinder barrel 1 are fixed axially in their position relative to one another without a clearance, whereby the closure element 2 is prevented in an effective manner from moving axially relative to the cylinder barrel 1.

In this way, so-called abrasion grinding phenomena on the sealing element 10 can be avoided, such as can otherwise occur in particular in the event of working cylinder load alternation and resulting slight movements of the closure element 2 relative to the cylinder barrel 1.

In the prior art, such slight movements between the closure element and cylinder barrel can arise owing to the fact that the annular grooves which receive the coupling ring must have a defined oversize in relation to the coupling ring in order to enable the coupling ring to assume its final position in the annular grooves when the closure element reaches its end position in the cylinder barrel.

Figure 8:
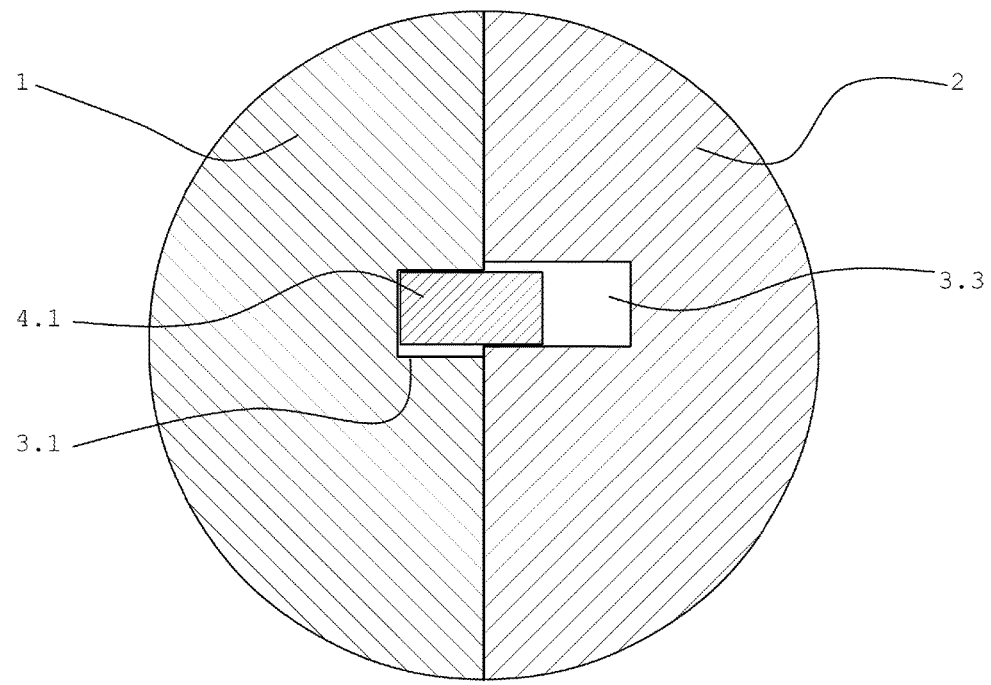

For illustration, reference is made in this regard to FIG. 8, which shows, in a detail view, the coupling partners 1 and 2 in their clearance end positions and the coupling ring 4.1 in its final position in the annular grooves 3.1 and 3.3 and the oversize of the annular grooves 3.1 and 3.3 in relation to the coupling ring 4.1.

Here, FIG. 8 shows an embodiment of the working cylinder in which the annular grooves 3.1 and 3.3 do not have a run-on bevel. FIG. 8 shows the relative position assumed by the cylinder barrel 1 and closure element 2 owing to the load in a clearance end position.

As a further advantage, the frictional locking that is provided makes it possible for axially acting forces when the working cylinder is subjected to load to be accommodated and for undesired twisting of the closure element 2 relative to the cylinder barrel 1 to be prevented.

In particular, owing to the additional accommodation of axial forces by way of the frictional locking, the maximum load and endurance strength of the working cylinder can be optimized.

Figure 2:
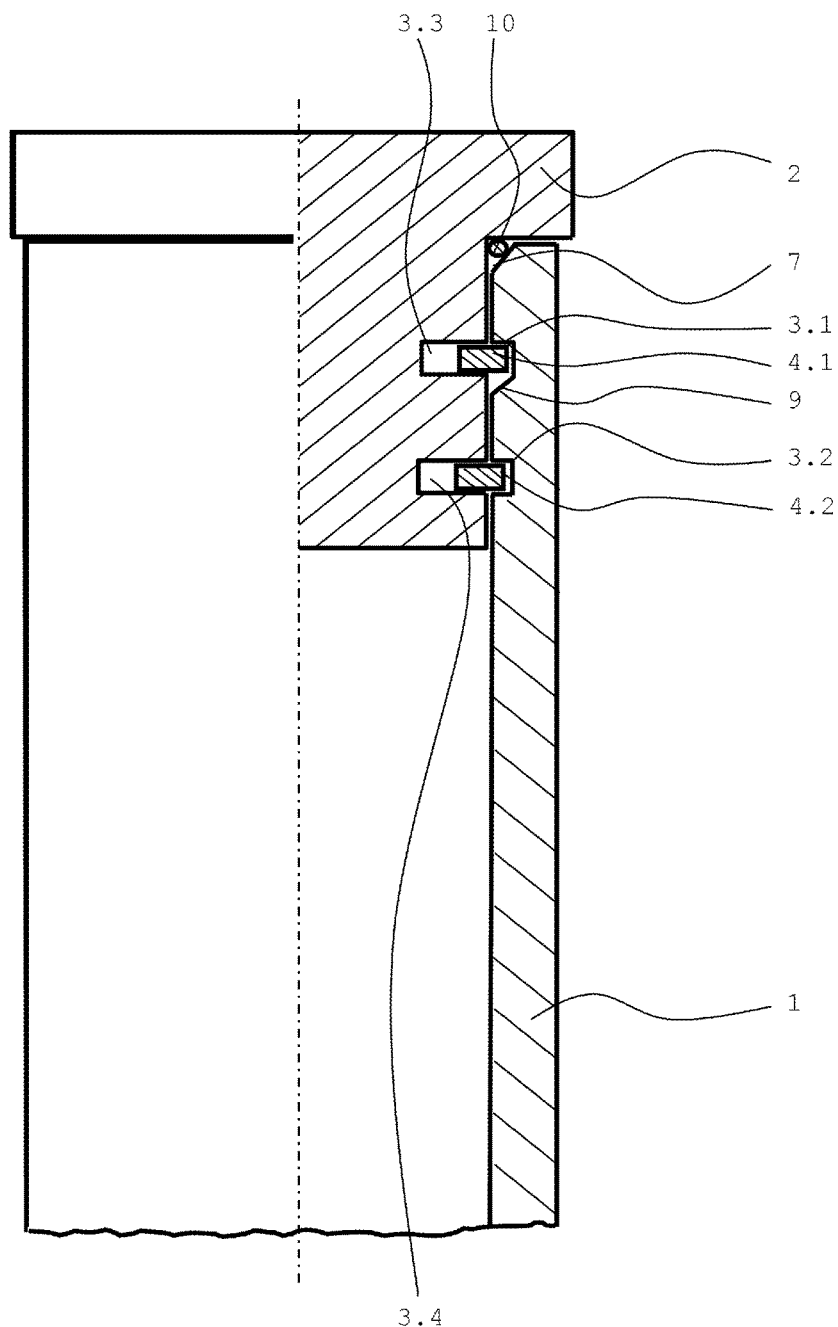

FIG. 2 shows an exemplary embodiment of a working cylinder according to the invention in half-section, wherein, to increase the axial load-bearing capacity, the working cylinder has two coupling rings 4.1 and 4.2.

In the present case, the coupling ring 4.1 is arranged in a first annular groove 3.1 of the cylinder barrel 1 and in a first annular groove 3.3 of the closure element 2.

By contrast, the coupling ring 4.2 is arranged in a second annular groove 3.2 of the cylinder barrel 1 and in a second annular groove 3.4 of the closure element 2.

To ensure complete insertion of the closure element 2 into the cylinder barrel 1, an annular groove bevel 9 is provided on the annular groove 3.1 of the cylinder barrel 1.

Said annular groove bevel 9 has the effect, in a particularly advantageous manner, that the second coupling ring 4.2, after it relaxes into the annular groove 3.1, is pushed back by the annular groove bevel 9 into the annular groove 3.3 of the closure element 2 again, and thus the insertion of the closure element 2 into the cylinder barrel 1 can be continued.

Furthermore, in the present exemplary embodiment as per FIG. 2, the sealing element 10 is arranged in the region of the run-on bevel 7 of the cylinder barrel 1.

The arrangement of the sealing element 10 in said region has the advantage in particular that no additional installation space has to be provided in the cylinder barrel 1 or in the closure element 2 for receiving the sealing element 10. The production outlay for a working cylinder according to the invention can thus be reduced.

Figure 3:
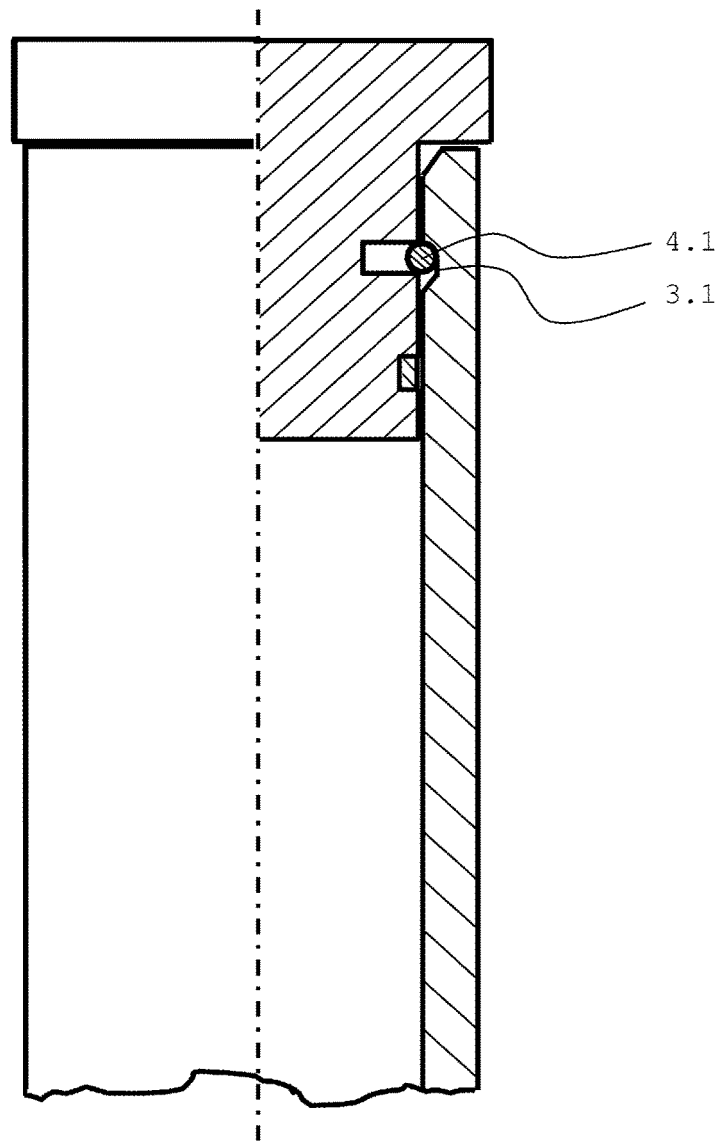

In a further exemplary embodiment as per FIG. 3, the coupling ring 4.1 has a circular cross section.

Such a circular cross section is, in a particularly advantageous manner, associated with a reduction in production costs for the coupling ring 4.1 and with an optimization of the profile of the internal stresses in the coupling ring 4.1 during the bracing thereof.

To realize as large a region as possible in which there is a positive locking action between the coupling ring 4.1 and the annular groove 3.1 of the cylinder barrel 1, said annular groove is adapted in terms of its contour to the cross-sectional geometry of the coupling ring 4.1.

The adaptation of the annular groove contour to the cross section of the coupling ring 4.1 furthermore has the technological advantage that, owing to the resulting roundings of the annular groove contour, notch effects that arise when the positively locking connection is subjected to load can be substantially eliminated.

Figure 4:
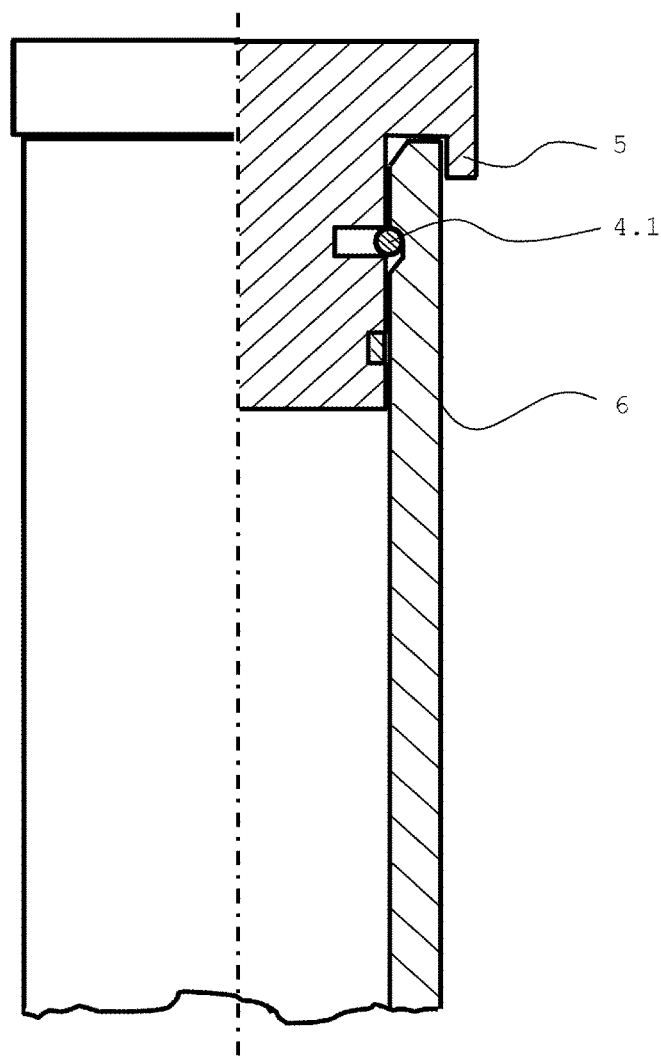

FIG. 4 shows a further exemplary embodiment of a working cylinder according to the invention.

In relation to the variant from FIG. 3, the closure element 2 in this case additionally has an overhang 5 which hangs over the external lateral surface 6 of the cylinder barrel 1.

It has been found that, through the provision of the overhang 5, when an internal pressure prevails in the cylinder barrel 1, an outwardly directed deformation of the cylinder barrel 1 can be counteracted in the region of the overhang 5, whereby the fit conditions between the coupled parts, that is to say the coupling partners 1 and 2, do not change in the operational load state.

Thus, in the case of a non-positively locking interference-fit connection being provided between the cylinder barrel 1 and the closure element 2, the overhang 5 has the special technological advantage that the non-positively locking connection is not released, such as can occur under some circumstances under the action of internal pressures prevailing in the cylinder barrel 1.

Thus, the overhang 5 has the effect in particular of positively influencing the endurance strength of a working cylinder according to the invention.

Figure 5:
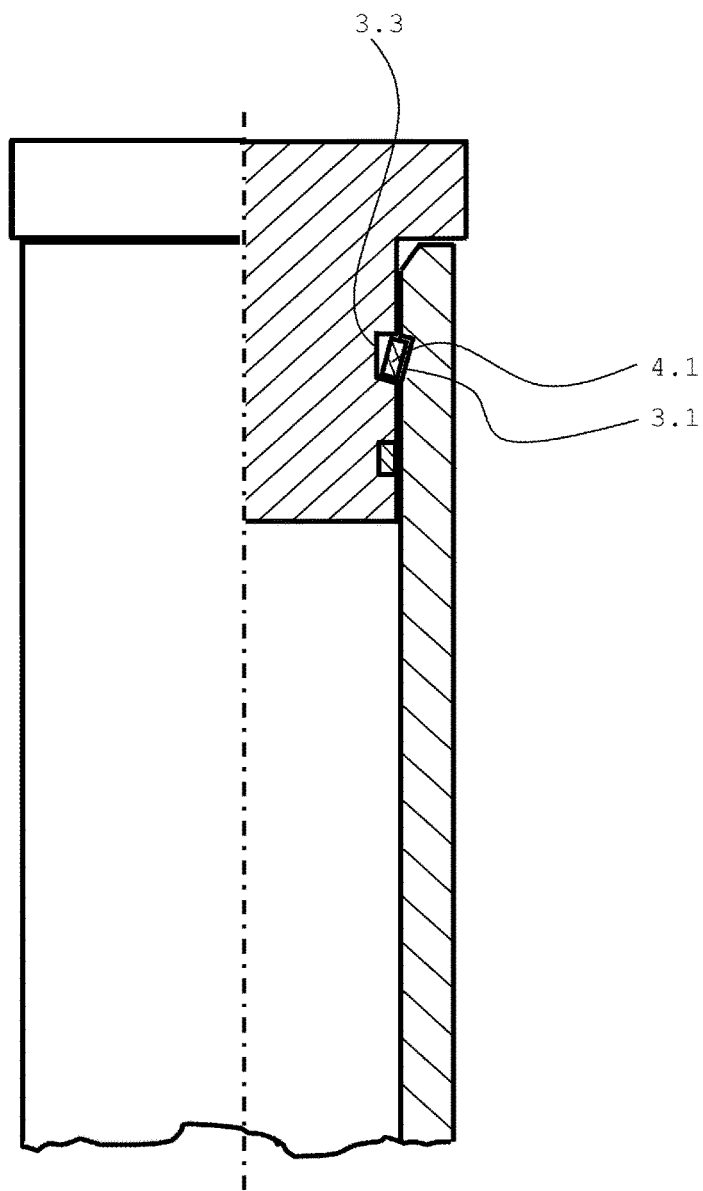

As a further exemplary embodiment, FIG. 5 shows a working cylinder according to the invention with a coupling ring 4.1 which is of conical form and which has multiple segments.

In this case, the annular grooves 3.1 and 3.3 are of a geometrical form such that, when the closure element 2 reaches the final assembled position in the cylinder barrel 1, the segments of the coupling ring 4.1 at least partially pivot into the annular groove 3.1 of the cylinder barrel 1.

Figure 6:
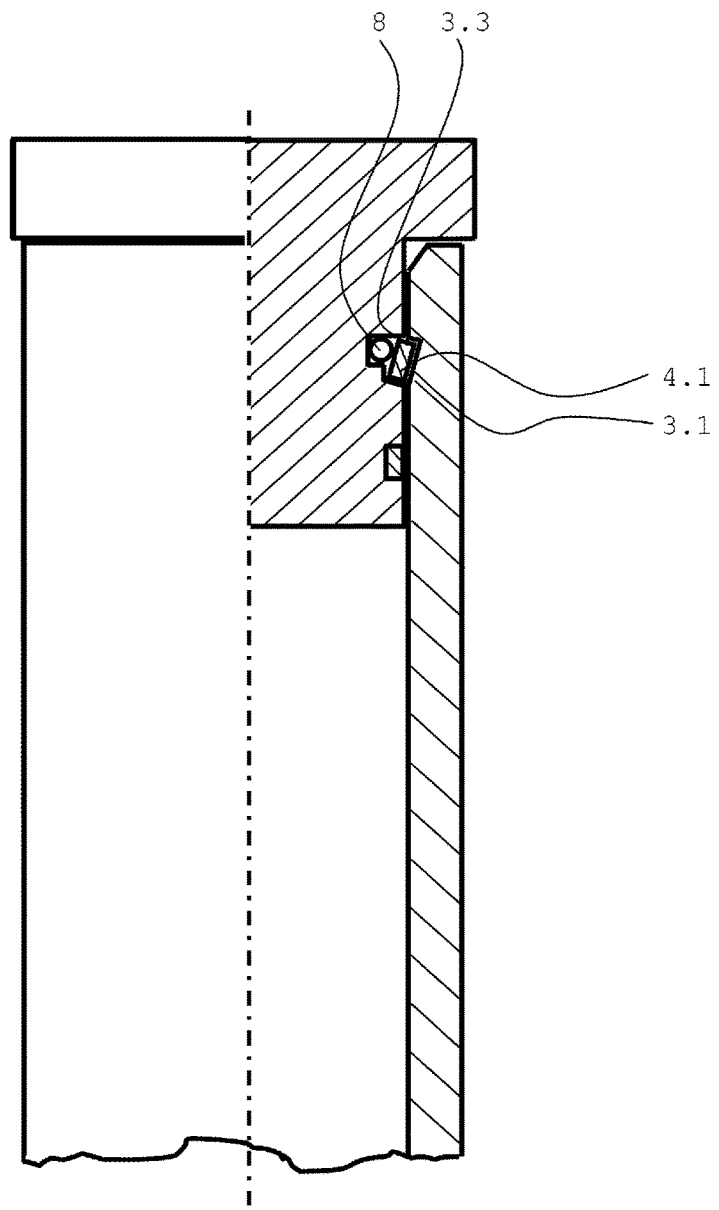

FIG. 6 shows a refinement of the working cylinder as per the exemplary embodiment from FIG. 5.

In this case, a working cylinder as per FIG. 6 additionally has an elastic element 8 which, according to the invention, is arranged in the annular groove 3.3 of the closure element 2.

According to the invention, the elastic element 8 acts radially on the coupling ring 4.1 and thus assists the relaxation thereof when the closure element 2 reaches the final position in the cylinder barrel 1.

Furthermore, the elastic element 8 ensures correct seating of the coupling ring 4.1 in the annular grooves 3.1 and 3.3 even in the event of insufficient relaxation of the coupling ring 4.1.

According to the invention, the elastic element 8 may for example be formed by an elastomer element with circular cross section or by a similarly shaped rubber element.

Furthermore, depending on the application, use may also be made of elastic elements with other cross sections.

Figure 7:
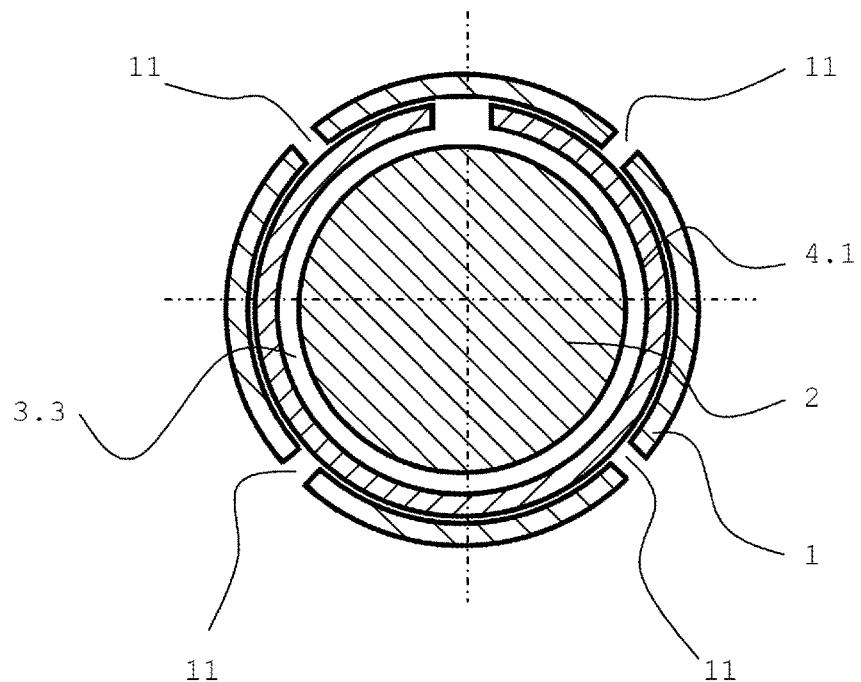

FIG. 7 shows a further exemplary embodiment of a working cylinder according to the invention in a sectional plan view.

In this case, the exemplary embodiment as per FIG. 7 provides that, in the cylinder barrel 1, access openings 11 are provided which make it possible for the coupling ring 4.1 to be manipulated from the outside for example by means of a suitable tool (not illustrated) or a screw (not illustrated). The access openings are preferably each arranged with a 120-degree offset.

By means of such external manipulation of the coupling ring 4.1, it is possible for said coupling ring to be pushed back into the annular groove 3.3 of the closure element 2 again, and thus for the engagement of the coupling ring 4.1 into the annular groove of the cylinder barrel 1 to be eliminated, in a particularly advantageous manner.

Thus, as a special technological advantage, a releasable connection between the cylinder barrel 1 and the closure element 2 is provided.

In a particularly advantageous embodiment, the access openings 11 may be provided with a thread into which a screw (not illustrated) can be screwed, which screw in turn causes the coupling ring 4.1 to be pushed back into the annular groove 3.1 of the closure element 2.

REFERENCE NUMERALS USED

1 Cylinder barrel
2 Closure element
3.1 First annular groove, cylinder barrel
3.2 Second annular groove, cylinder barrel
3.3 First annular groove, closure element
3.4 Second annular groove, closure element
4.1 First coupling ring
4.2 Second coupling ring
5 Overhang
6 Lateral surface
7 Run-on bevel
8 Elastic element
9 Annular groove bevel of the first annular groove, closure element
10 Sealing element
11 Access openings

The invention claimed is:

1. A working cylinder, comprising:
a first coupling partner being a cylinder barrel and a second coupling partner being a closure element, said first coupling partner and said second coupling partner being inserted axially into one another;
said first and second coupling partners each having a respective annular groove formed therein, said annular groove of an inserted coupling partner of said first and second coupling partners being an external groove and said annular groove of a remaining coupling partner being an internal groove, said annular grooves of said first and second coupling partners being disposed opposite one another; and
a coupling ring for being resiliently braced, said coupling ring, when deformed in a bracing direction, being fully received in said annular groove of one of said first and second coupling partners and said coupling ring, when deformed in a relaxation direction, engaging into said annular grooves of said first and second coupling partners in an engagement, the engagement of said coupling ring into said annular grooves of said first and second coupling partners effecting a positively locking connection between said first and second coupling partners;
said inserted coupling partner having an oversize in relation to an internal diameter of said remaining coupling partner, for providing an interference fit effecting a non-positively locking connection between said first and second coupling partners;
a hybrid coupling action produced by said interference fit and said coupling ring, said hybrid coupling action including a frictional locking between said first and second coupling partners resulting from said interference fit for axially and rotationally locking said first and second coupling partners to one another, said coupling ring for accommodating axial forces acting on said first and second coupling partners;
said interference fit being set to an interference allowing said first and second coupling partners to move into a clearance end position of said coupling ring with said coupling ring engaged by opposing axial side walls of said annular grooves when a full operating pressure is applied to the working cylinder, said interference fit being set to an interference that preventing an axial return movement out of said clearance end position and maintaining said end position under load alternation of the working cylinder.

2. The working cylinder according to claim 1, wherein said second coupling partner is insertable into said first coupling partner, said coupling ring is fully received by said annular groove of said second coupling partner.

3. The working cylinder according to claim 1, wherein said second coupling partner has an overhang, said overhang engages in sections over said first coupling partner at an outer lateral surface thereof.

4. The working cylinder according to claim 1, wherein said coupling ring or said coupling partner which does not fully receive the coupling ring has a run-on bevel, said run-on bevel causes said coupling ring to be fully received in said respective annular groove of said coupling partner which fully receives the coupling ring.

5. The working cylinder according to claim 1, wherein said first and second coupling partners have further, axially offset annular grooves to receive further, axially offset coupling rings.

6. The working cylinder according to claim 1, wherein said coupling ring has a circular cross section.

7. The working cylinder according to claim 1, wherein said first and the second coupling partners have different moduli of elasticity, a first area of overlap between said engaged coupling ring and a side wall of said annular groove of one of said coupling partners, which has the higher modulus of elasticity, is smaller than a second area of overlap between said coupling ring and a side wall of said annular groove of the other coupling partner, which has a lower modulus of elasticity.

8. The working cylinder according to claim 1, wherein said coupling ring is of conical and segmented form.

9. The working cylinder according to claim 1, wherein said annular groove in said coupling partner which fully receives the coupling ring is provided with an elastic element which acts radially on the coupling ring.

10. The working cylinder according to claim 1, wherein said remaining coupling partner has radially arranged access openings, said access openings permit manipulation of said coupling ring from an outside thereof.

\* \* \* \* \*